R. F. SPENCER.
RESILIENT WHEEL.
APPLICATION FILED MAY 3, 1916.

1,227,848. Patented May 29, 1917.

Inventor
R. F. Spencer,

Witnesses
Celium Rylander
Mrs. Lola Spencer

By
Attorneys

UNITED STATES PATENT OFFICE.

RALPH F. SPENCER, OF OSCEOLA, ILLINOIS.

RESILIENT WHEEL.

1,227,848.   Specification of Letters Patent.   Patented May 29, 1917.

Application filed May 3, 1916. Serial No. 95,164.

*To all whom it may concern:*

Be it known that I, RALPH F. SPENCER, a citizen of the United States, residing at Osceola, in the county of Stark, State of Illinois, have invented certain new and useful Improvements in Resilient Wheels; and I do hereby declare the following to be a full, clear, and exact description of the invention, such as will enable others skilled in the art to which it appertains to make and use the same.

The present invention is directed to improvement in resilient wheels, and has for its object to provide a device of this character particularly adapted for use in connection with motor vehicles.

A further object of the invention is to provide a wheel for this purpose having the characteristics of a wheel equipped with pneumatic tire, but at the same time eliminating the objectional features, such as punctures and blow-outs, to which pneumatic tires are subjected.

A still further object of the invention is to provide a wheel for this purpose having resilient spokes which are connected to the felly and hub in a novel manner.

With these and other objects in view, this invention resides in the novel features of construction, formation, combination and arrangement of parts to be hereinafter more fully described, claimed and illustrated in the accompanying drawing, in which:—

Figure 1:
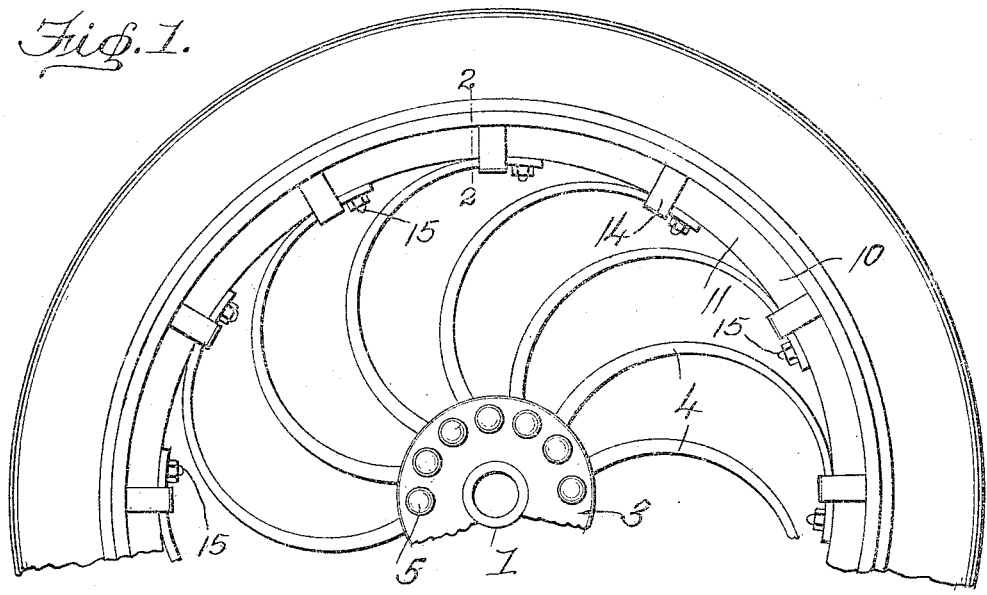
Figure 1 is a fragmentary side elevation of the device.
Figure 3:
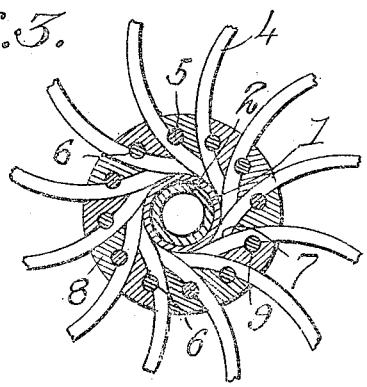
Fig. 3 is a sectional view on line 3—3 of Fig. 2.
Figure 2:
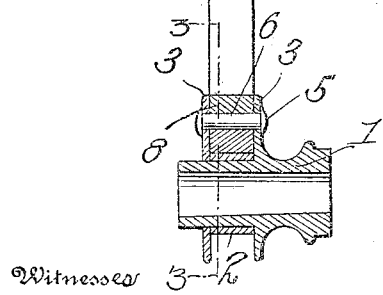
Fig. 2 is a sectional view on line 2—2 of Fig. 1.
Figure 4:
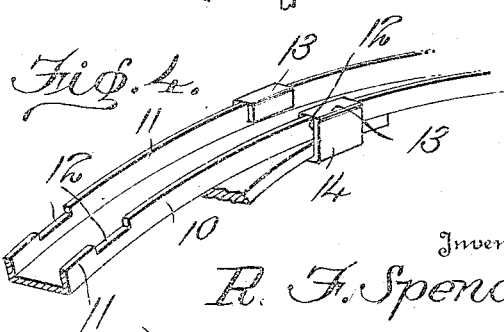
Fig. 4 is a fragmentary detail perspective view of the felly showing a clip 14 arranged in position.

Referring to the drawing 1 designates the hub, said hub having fixed thereto a ring 2. Associated with the hub are annular plates 3 which are held in clamping engagement with the inner ends of the spokes 4 by bolts 5. These spokes 4 are formed from resilient metal and taper outwardly, and are provided adjacent their inner ends with notches 6 which receive the bolts 5 so as to prevent withdrawal of the spokes from between the plates 3. It will be noted that the inner ends of the spokes 4 are beveled as at 7 so that the adjacent ends can fit snugly. The extreme inner ends of the spokes 4 rest against the ring 2.

Adapted to be placed between the spokes 4 are blocks 8, said blocks being substantially triangular in shape and have one of their faces provided with notches 9 which are engaged by the bolts 5, thereby firmly holding the blocks in place.

The felly 10 is formed from channel iron and has its side walls 11 provided with recesses 12 which are engaged by the hook ends 13 of the clips 14, said clips being engaged with the outer ends of the spokes 4, and at points adjacent the bolts 15, said bolts being passed through the extreme outer ends of the spokes 4 and felly 10. By providing the recesses 12 it is obvious that the clips 14 will be prevented from creeping.

Fixed to the felly 10 is a rim 16, said rim being of any conventional form for use in connection with cushion or pneumatic tires. Of course it is obvious that the rim 16 can be used without the tires if desired.

What is claimed is:

A wheel of the class described comprising a hub, resilient spokes having their inner ends engaged with the hub, a felly formed from channel iron and engaged with the outer ends of the spokes, the sides of the felly having recesses formed therein, clips carried by the felly, and engaged with the outer ends of the spokes, said clips having hooked ends engaged with the recesses to prevent the clips from creeping and a rim supported by the walls of the felly and engaged with said hooked ends.

In testimony whereof, I affix my signature, in the presence of two witnesses.

RALPH F. SPENCER.

Witnesses:
 CELIUM RYLANDER,
 LOLA SPENCER.

Copies of this patent may be obtained for five cents each, by addressing the "Commissioner of Patents, Washington, D. C."